(12) United States Patent
Katayama

(10) Patent No.: US 6,427,737 B1
(45) Date of Patent: Aug. 6, 2002

(54) PNEUMATIC TIRE HAVING AT LEAST FOUR SIPES

(75) Inventor: Masahiro Katayama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/295,390

(22) Filed: Apr. 21, 1999

(30) Foreign Application Priority Data

Apr. 22, 1998 (JP) .......................................... 10-112492
Apr. 22, 1998 (JP) .......................................... 10-112554

(51) Int. Cl.$^7$ .......................... B60C 11/11; B60C 11/12; B60C 107/00
(52) U.S. Cl. ............................ 152/209.21; 152/209.23; 152/902; 152/DIG. 3
(58) Field of Search ........................ 152/209.18, 209.21, 152/209.23, DIG. 3, 902

(56) References Cited

U.S. PATENT DOCUMENTS

| | | | | |
|---|---|---|---|---|
| 4,566,514 A | * | 1/1986 | Mauk et al. ............ | 152/DIG. 3 |
| 4,598,747 A | * | 7/1986 | Flechtner ............... | 152/DIG. 3 |
| 4,794,965 A | * | 1/1989 | Lagnier ................. | 152/DIG. 3 |
| 4,934,424 A | * | 6/1990 | Kojima ................... | 152/DIG. 3 |
| 4,994,126 A | * | 2/1991 | Lagnier ................. | 152/DIG. 3 |
| 5,350,001 A | | 9/1994 | Beckmann et al. | |
| 5,783,002 A | * | 7/1998 | Lagnier ................. | 152/DIG. 3 |
| 5,950,700 A | * | 9/1999 | Fukuoka ................ | 152/DIG. 3 |

FOREIGN PATENT DOCUMENTS

| | | | | |
|---|---|---|---|---|
| EP | 664230 | * | 7/1995 | ............ 152/209.23 |
| EP | 810104 | * | 12/1997 | |
| EP | 890457 | | 1/1999 | |
| FR | 2703002 | | 9/1994 | |
| JP | 2-246810 | * | 10/1990 | ............ 152/DIG. 3 |
| JP | 3-139404 | * | 6/1991 | |
| JP | 5-58118 | * | 3/1993 | |
| JP | 8-207514 | * | 8/1996 | |
| JP | 8-244419 | * | 9/1996 | |
| JP | 9-94829 | * | 4/1997 | |
| WO | WO 96/01190 | * | 1/1996 | ............ 152/209.23 |
| WO | 99/48707 | | 9/1999 | |

OTHER PUBLICATIONS

Translation for Japan 3–139404.*
Translation for Europe 664230.*
Translation for Japan 8–244419.*
Abstract for French 2703002.*
Patent Abstracts of Japan, V 14, N572 (M1061) Dec. 19, 1990 (JP 2–246810).
Patent Abstracts of Japan, V1997, N8, Aug. 29, 1997 (JP 9–94829).

* cited by examiner

Primary Examiner—Steven D. Maki
(74) Attorney, Agent, or Firm—Sughrue Mion, PLLC

(57) ABSTRACT

A pneumatic tire comprising a tread which comprises block-shaped land portions and a plurality of specific sipes formed on the block-shaped land portions is disclosed. At least in one portion in the direction of the depth of the sipe, the sipe has an amplitude in the direction of the width of the sipe and extends in the transverse direction of the tire, and at least one portion of each sipe in the direction of the depth of the sipe is disposed at an offset position relative to an other portion of the sipe in a circumferential direction of the tire. The amplitude of the sipe in the present invention may change in the direction of the depth and the change may alternate from an increase to a decrease or from a decrease to an increase at one or a plurality of node positions disposed in the sipe in the direction of the depth of the sipe. The cross-section of the sipe in a circumferential direction of the tire may have a specific shape, such as a shape which is substantially symmetrical with respect to the central line of the block-shaped land portion in the circumferential direction of the tire. Deterioration in the road holding property caused by an increase in the number of the sipe can be suppressed and the grip performance on wet surfaces, the acceleration and braking performance on ice and the resistance to irregular wear of the tire can all be improved by the above construction.

15 Claims, 11 Drawing Sheets

F I G. 4
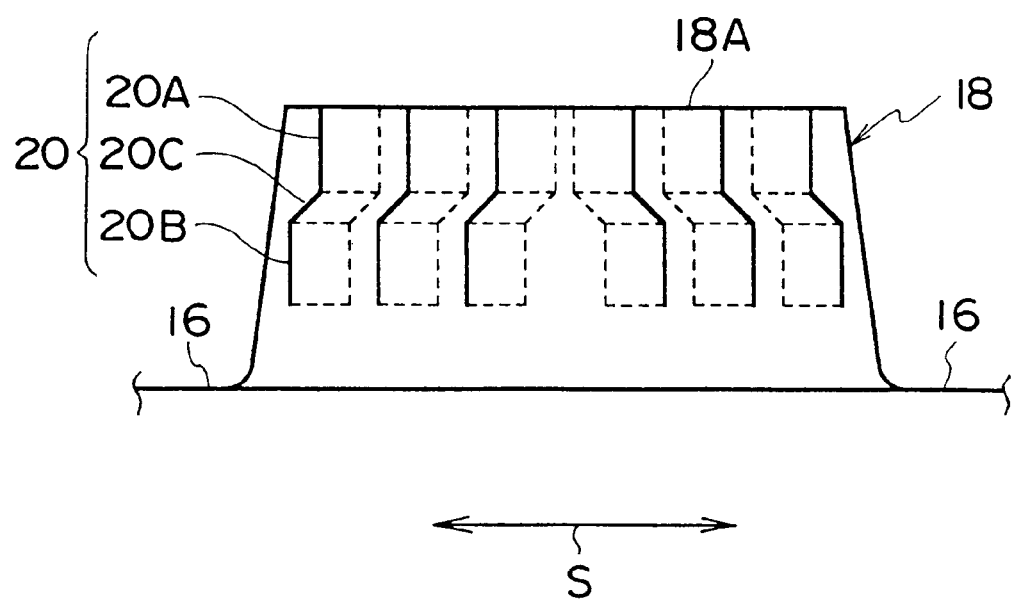

F I G. 9
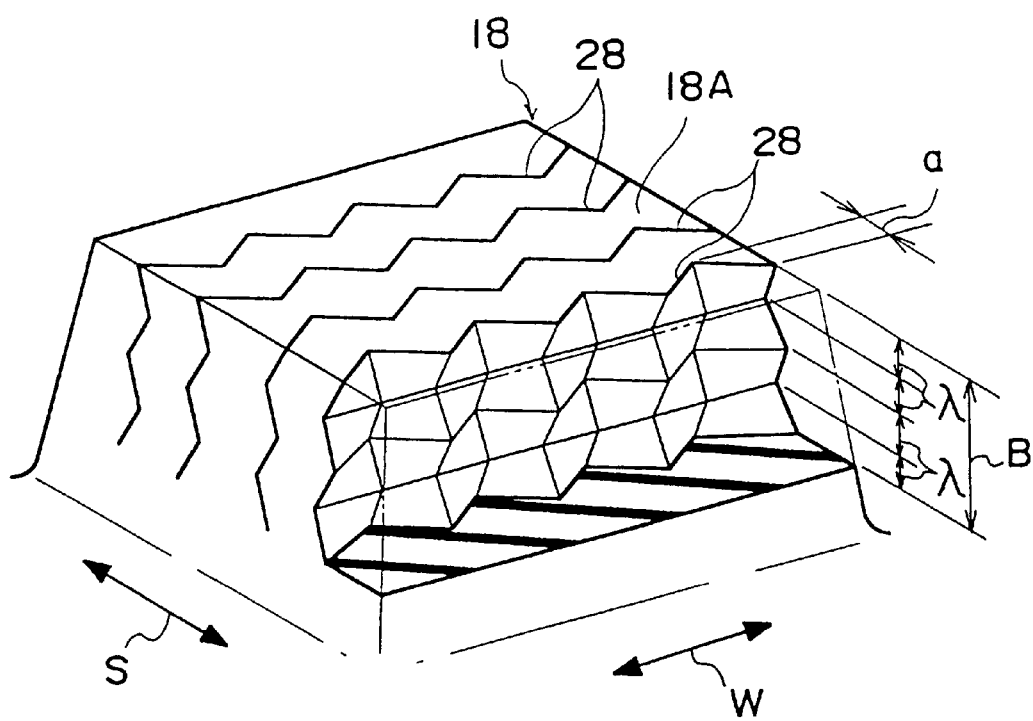

F I G. 1 1
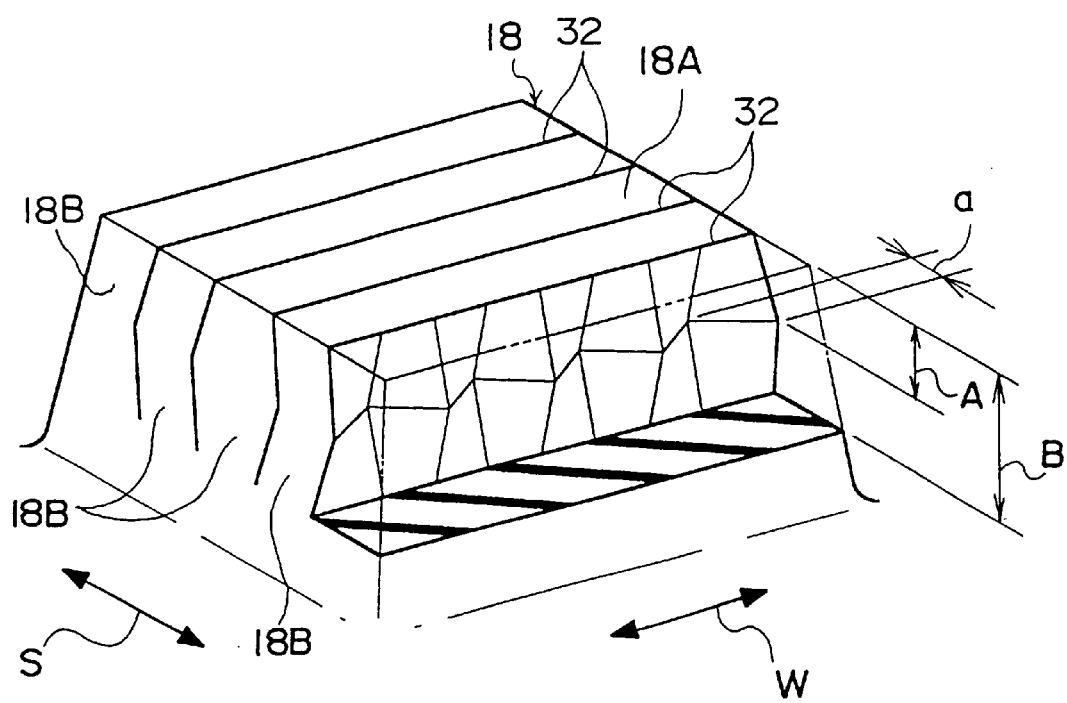

PNEUMATIC TIRE HAVING AT LEAST FOUR SIPES

BACKGROUND OF THE INVENTION

1. Field of the Invention

The present invention relates to a pneumatic tire, and more particularly, to an improved tire exhibiting excellent performance in driving on ice and snow.

2. Description of the Related Art

The use of studded tires has been prohibited and various improvements with treads have been made to produce more improved excellent studless tires.

Such studless tires have a common characteristic in that the treads have many sipes extending straightly in the direction of the depth.

A surface of the tread is divided into many blocks by the sipes. The shape of the sipe in the transverse direction has been studied to increase the friction coefficient ($\mu$) on ice by using corner portions of the blocks (the edge effect).

As conventional methods for increasing the friction coefficient on ice, there are a method in which the number of the sipe is increased and a method in which the draining performance is improved.

When the number of the sipes is increased in accordance with a conventional method, the road holding property deteriorates due to a decrease in rigidity of the block and a desired effect cannot be obtained. Moreover, the deterioration in the road holding property causes irregular wear (heel-and-toe wear).

SUMMARY OF THE INVENTION

The present invention has been made to overcome the above problem. An object of the present invention is to provide a pneumatic tire which can suppress deterioration in the road holding property caused by an increase in the number of the sipe and exhibits improvements in all of the grip performance of the tire on wet surfaces, the acceleration and braking performance on ice and resistance to irregular wear(abrasion).

In the first aspect of the present invention, the pneumatic tire comprising a tread which comprises: block-shaped land portions divided by a plurality of main grooves extending in a circumferential direction of the tire and by many lug grooves intersecting the main grooves, and a plurality of sipes formed on the block-shaped land portions; wherein at least one portion of the sipe in the direction of the depth of the sipe has an amplitude in the direction of the width of the sipe and extends in the transverse direction of the tire, and at least one portion of each sipe in the direction of the depth of the sipe is disposed at an offset position in the circumferential direction of the tire relative to an other portion of the sipe.

The portion disposed in an offset position in the circumferential direction of the tire and the other portion of the sipe adjacent to the portion disposed at an offset position are connected to each other through a connecting portion extending in a direction intersecting the radial direction of the tire.

The amplitude of the sipe in the direction of the width of the sipe may change in the direction of the depth of the sipe, and the change in the amplitude occurs at one or a plurality of node positions disposed in the sipe in the direction of the depth of the sipe.

In the second aspect of the present invention, the pneumatic tire comprising a tread which comprises: block-shaped land portions divided by a plurality of main grooves extending in the circumferential direction of the tire and by many lug grooves intersecting the main grooves, and a plurality of sipes formed on the block-shaped land portions; wherein at least one portion of the sipe in the direction of the depth of the sipe has an amplitude in the direction of the width of the sipe and extends in the transverse direction of the tire, and the amplitude of the sipe in the direction of the width of the sipe changes in the direction of the depth of the sipe, the change in the amplitude alternating from an increase to a decrease or from a decrease to an increase at one or a plurality of node positions disposed in the sipe in the direction of the depth of the sipe.

In other words, at some position in the direction of the depth, the sipe in the pneumatic tire of the present invention has a bending portion which is formed by the portion disposed at an offset position in the circumferential direction of the tire in the first aspect of the present invention, and by the change in amplitude in the direction of the width of the sipe in the second aspect of the present invention. Therefore, the sipe of the present invention has an increased area of contact between the side faces of the sipe and exhibits an increased effect of suppressing bending down of the block-shaped land portion when acceleration or braking is applied in comparison with sipes having a conventional shape which extends straightly in the direction of the depth.

The bending down of the block-shaped land portion under application of acceleration or braking can be more effectively suppressed by the sipes in the present invention than by conventional sipes even when the number of the sipe increases because the area of contact between the side faces of the sipes and the force of contact between the sipes under deformation by compression force increase by the effect of the amplitude.

Therefore, in the pneumatic tire of the present invention, the increase in deformation of the block-shaped land portion due to the increase in the number of the sipe can be suppressed and deterioration in the road holding property can be suppressed. Thus, the pneumatic tire of the present invention can exhibit improvements in all of the grip performance of the tire on wet surfaces, the acceleration and braking performance on ice and the resistance to irregular wear.

In the third aspect of the present invention, the sipe substantially bent in the direction of the depth in accordance with the first aspect described above is characterized in that a cross-section of the sipe in the circumferential direction of the tire has a shape such that an offset shape in the region in the circumferential direction of the tire at one side of the central line of the block-shaped land portion in the circumferential direction of the tire and an offset shape in the region in the circumferential direction of the tire at the other side of said central line correspond to each other.

In the present aspect, the cross-section of the sipe in the circumferential direction of the tire may have a shape which is substantially symmetrical with respect to the central line of the block-shaped land portion in the circumferential direction of the tire.

In accordance with the third aspect, deformation of small blocks which are divided by the sipes is suppressed by the force of contact between the side faces of the small blocks at both sides of the sipe and thus the effect of suppressing deformation of the block-shaped land portion further increases.

In the fourth aspect of the present invention, the cross-section of the sipe in the circumferential direction of the tire has a shape such that the sipes adjacent to each other have shapes which are substantially symmetrical with respect to the central line between the sipes in the direction of the depth of the sipes.

In accordance with the fourth aspect, deformation of small blocks is suppressed by the force of contact between adjacent small blocks. In accordance with the present aspect, small blocks disposed at every other positions has a greater width around the bottom and show a greater rigidity and the deformation is more effectively suppressed. The deformation of the block-shaped land portion is suppressed with an improved balance.

In the fifth aspect of the present invention, the cross-section of the sipe in the circumferential direction of the tire has a shape such that a bending portion having a substantially bent shape is disposed in the sipe at a position in the direction of a depth which differs from sipe to sipe.

In accordance with the fifth aspect, for example, when each sipe has a single bending portion, the sipes may be formed in a manner such that the closer the position of the sipe to the central line in the circumferential direction of the tire, the deeper in the direction of the depth the position of the bending portion having a substantially bent shape. When the sipes are formed in this manner, rigidity of bending of the block-shaped land portion gradually increases from the central line in the circumferential direction of the block toward the side face of the block-shaped land portion open to a lug groove. Therefore, the present construction of the sipes shows an improved effect of suppressing bending down than conventional constructions of sipes.

BRIEF DESCRIPTION OF THE DRAWINGS

FIG. 4 shows a side view exhibiting a modified example of a block-shaped land portion of a pneumatic tire in accordance with the first embodiment of the present invention.

FIG. 9 shows a perspective view of a block-shaped land portion of a pneumatic tire in accordance with the fourth embodiment of the present invention.

FIG. 11 shows a perspective view of a block-shaped land portion of a pneumatic tire in accordance with the sixth embodiment of the present invention.

DETAILED DESCRIPTION OF THE INVENTION

First Embodiment

The first embodiment of the pneumatic tire of the present invention will be described with reference to FIGS. 1A to 5 in the following.

The pneumatic tire 10 of the present embodiment has an inner structure of a conventional radial tire and descriptions of the inner structure are omitted.

Figure 3:
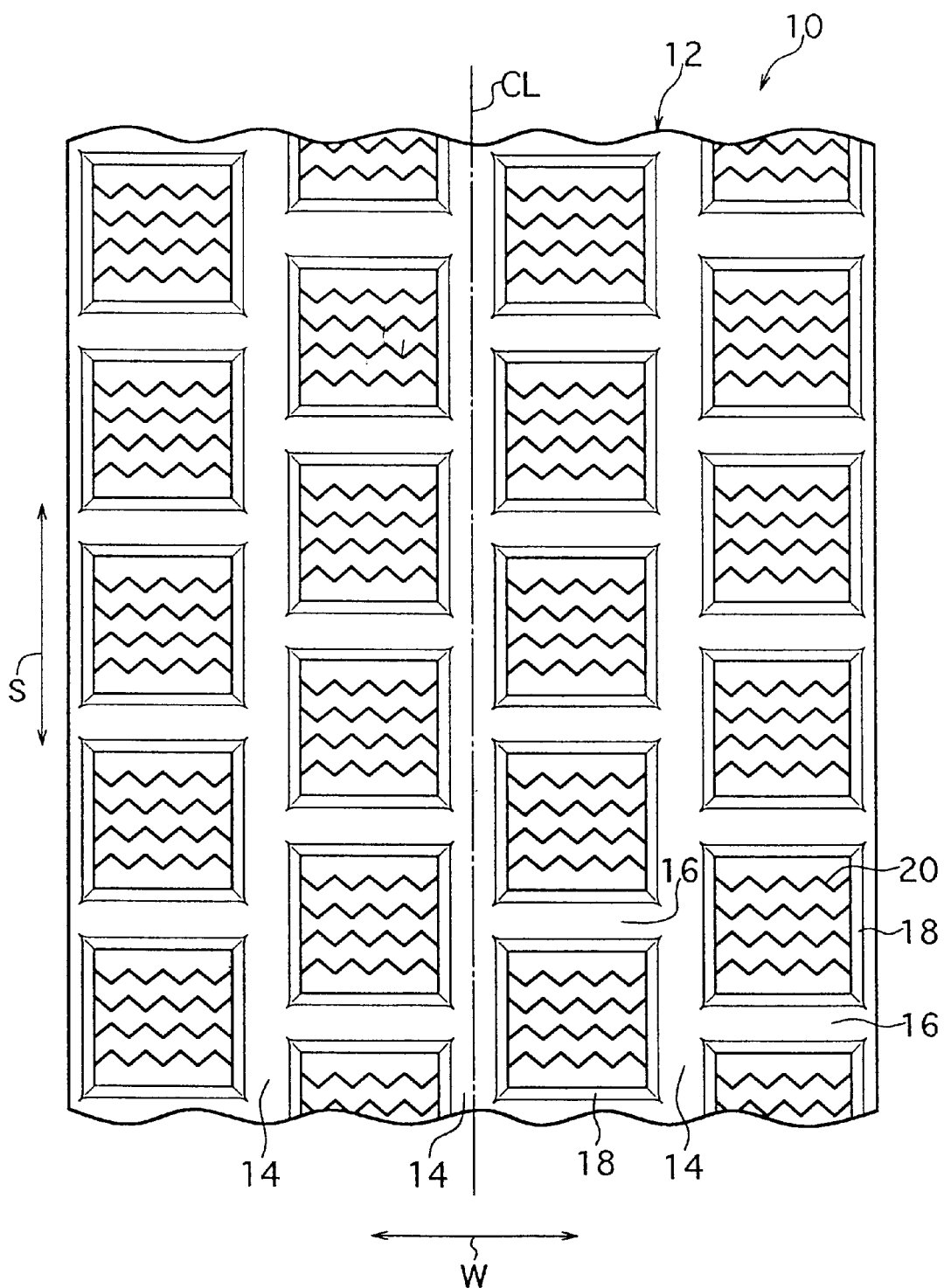
FIG. 3 shows a plan view exhibiting a portion of a tread of a pneumatic tire in accordance with the first embodiment of the present invention.

As shown in FIG. 3, a plurality of main grooves 14 extending in the circumferential direction of the tire (the direction shown by the arrow S) and many lug grooves 16 intersecting the main grooves 14 are formed in a tread 12 of the pneumatic tire 10 of the present invention. Block-shaped land portions 18 are separated by the main grooves 14 and the lug grooves 16.

In the present embodiment, the main grooves 14 and the lug grooves 16 are both straight. The main grooves 14 may be other conventional grooves having shapes such as a zigzag shape or a cranked shape and extending in the circumferential direction of the tire with a specific distance between individual grooves. The lug grooves 16 may also be other grooves having a shape such as a zigzag or a bent shape.

Figure 1A:
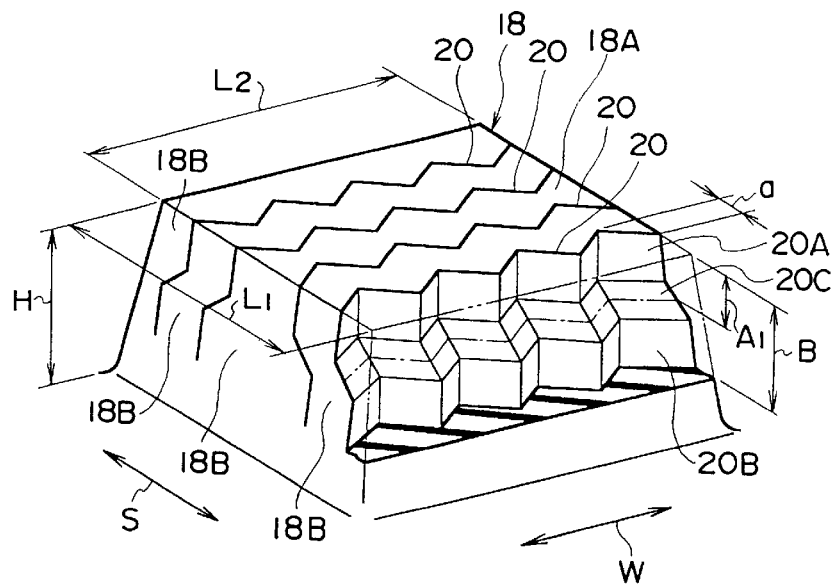
FIG. 1A shows a perspective view of a block-shaped land portion of a pneumatic tire in accordance with the first embodiment of the present invention.

As shown in FIG. 1A and FIG. 3, the block-shaped land portion 18 of the present embodiment has a square shape in which the length L1 in the circumferential direction of the tire and the length L2 in the transverse direction of the tire (the direction shown by the arrow W) are set to be the same length. However, other shapes such as a rectangular shape may be used.

As shown in FIG. 3, a plurality of sipes 20 which extends in the transverse direction of the tire and crosscuts the block-shaped land portions 18 are formed on each of the block-shaped land portions 18. Each of the block-shaped land portions 18 is divided into a plurality of small blocks (small land portions) 18B by the plurality of sipes 20.

As shown in FIG. 1A, the sipe in the present embodiment is a so-called zigzag sipe (a sipe having a triangular wave shape) having an amplitude a. In the pneumatic tire of the present embodiment, at least at a portion in the direction of the depth, the sipe has an amplitude in the direction of the width of the sipe and extends in the transverse direction of the tire.

In the present embodiment, two portions each having an amplitude in the direction of the width of the sipe and extending in the transverse direction of the tire are disposed at offset positions with respect to each other and are connected to each other via a connecting portion extending in a direction intersecting the radial direction of the tire.

FIG. 1 shows an example of the sipe which is composed of a first portion 20A, a second portion 20B and an inclined portion 20C. The first portion 20A and the second portion 20B each has an amplitude a in the direction of the width of the sipe and extends in the transverse direction of the tire.

The first portion 20A and the second portions 20B are disposed at offset positions with respect to each other in the circumferential direction of the tire. The inclined portion 20C is a connecting portion which is connected to the adjacent end portion of the first portion 20A and the adjacent end portion of the second portion 20B and extends in the transverse direction of the tire.

Figure 1B:
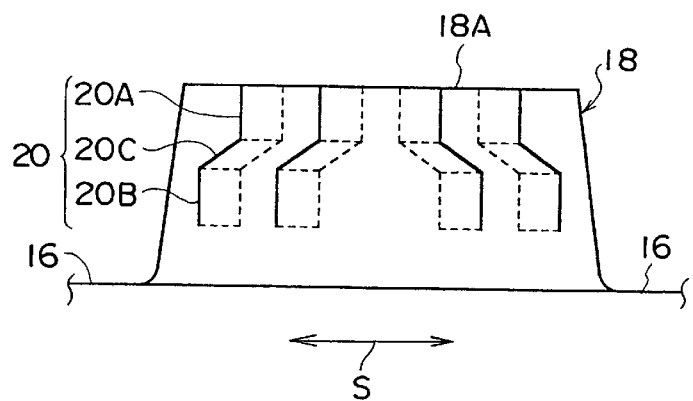
FIG. 1B shows a side view of the block-shaped land portion shown in FIG. 1A.
Figure 2:
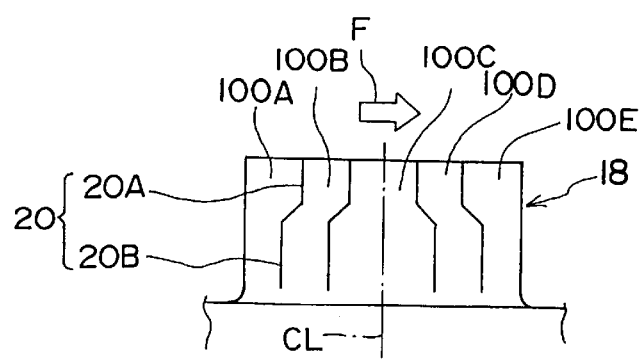
FIG. 2 shows another side view of the block-shaped land portion shown in FIG. 1A for describing function of a pneumatic tire in accordance with the first embodiment of the present invention.

In the pneumatic tire in accordance with the present embodiment shown in FIGS. 1A, 1B and 2, the amplitude a does not change in the first portion 20A and the second portion 20B, and is set at a constant value.

The sipe 20 may have any shape as long as the sipe has the amplitude of a at a surface 18A that contacts the road. The shape at the surface that contacts the road may be a zigzag shape or other shapes such as a sine curve.

As shown in FIGS. 1A and 1B, the sipe 20 in the block-shaped land portion 18 is composed of the first portion 20A, the second portion 20B and the inclined portion 20C. The first portion 20A extends in a direction substantially perpendicular to the surface 18A that contacts the road and reaches the surface 18A that contacts the road. The second portion 20B extends in a direction substantially perpendicular to the surface 18A that contacts the road, is more distant from the surface 18A that contacts the road than the first portion 20A and is disposed at an offset position relative to the first portion 20A towards a side more distant from the center of the block-shaped land portion 18 in the circumferential direction of the tire. The inclined portion 20C is connected to the adjacent end portion of the first portion 20A and to the adjacent end portion of the second portion 20B and extends obliquely downward from the first portion 20A to the second portion 20B.

In the present embodiment, a depth B of the sipe 20 is set at the same value for all of the sipes 20. A dimension $A_1$ from the surface 18A that contacts the road to a central position (a position shown by a single-dashed chain line in FIG. 1A) of the inclined portion 20C measured in the perpendicular direction is set at the same value for all of the sipes 20.

The depth of the sipe B and the dimension $A_1$ are set so as to satisfy the relation: $1/10 < A_1/B < 2/3$.

When the relation of $A_1$ and B is in a range of $A_1/B < 1/10$, an effect of the present invention may be lost in an early stage of wear because the inclined portion 20C soon disappears and heel-and-toe wear takes place in a middle stage of wear due to the decrease in rigidity of the block.

When the relation of $A_1$ and B is in a range of $2/3 < A_1/B$, rigidity decreases only at a bottom portion (a base portion) of the small blocks separated by the sipes 20. Deformation is thus concentrated to an area around the bottom portion of the small blocks and bending down of the block-shaped land portion 18 cannot be suppressed. Therefore, heel-and-toe wear takes place in an early stage of wear.

An operation of the pneumatic tire 10 of the present embodiment will be described in the following.

In FIG. 2, the sipes 20 each having the first portion 20A and the second portion 20B are formed in the block-shaped land portion 18. Force shown by an arrow F is applied to the surface of the block-shaped land portion 18 that contacts the road. Small blocks 100A and 100B each leans against a small block adjacent to the small block in a direction shown by the arrow F. In other words, the small block 100A leans against the small block 100B and the small block 100B leans against a small block 100C. The side faces of the sipe 20 between the small block 100A and the small block 100B contact each other and the side faces of the sipe 20 between the small block 100B and the small block 100C contact each other.

Deformation of the small blocks 100A and 100B can be suppressed by the force of contact between the side faces of the sipes 20 described above.

The small block 100C receives a force of contact from the small block 100B. However, deformation of the small block 100C is suppressed because the width around a bottom portion is large and the block has a greater rigidity. Even when rigidity of the small block 100C is insufficient, the small block 100C is supported by small blocks 100D and 100E which do not bend down by the applied force (F). Normally, deformation of the small blocks 100D and 100E is suppressed by the rigid small block 100C.

Therefore, in the pneumatic tire of the present embodiment, the effect of suppressing deformation of block-shaped land portion is greater than that in conventional tires.

In more detail, the sipe 20 in the pneumatic tire 10 of the present embodiment has the inclined portion 20C at an intermediate portion in the direction of the depth. Therefore, in comparison with a sipe extending straightly in the direction of the depth and having the same depth as the depth of the sipe 20, the area of contact between the side faces of the sipe increases and the effect of suppressing bending down of the block-shaped land portion 18 when acceleration or braking is applied increases.

At the inclined portion 20C, the side faces of the sipe contact each other easily when the block-shaped land portion 18 is deformed by compression force because the inclined portion 20C is disposed in a direction intersecting the direction of the compression, and the force of contact between sipes caused by deformation of the block further increases. Therefore, the block-shaped land portion 18 of the present embodiment shows less bending down than conventional blocks in which sipes without the inclined portions 20C are formed.

Thus, the pneumatic tire 10 of the present embodiment can effectively suppress bending down of the block-shaped land portion 18 under application of acceleration or braking even when the number of the sipes increases because the contact area between the side faces of the sipe increases and the force of contact between the sipes at the inclined portion 20C increases under deformation by compression force, due to the presence of the inclined portion 20C.

As described above, in the pneumatic tire 10 of the present embodiment, deterioration in the road holding property can be suppressed by suppressing the increase in deformation of the block-shaped land portion 18 in a case in which the number of the sipes is increased. As a result, the grip performance of the tire on wet surfaces, the acceleration and braking performance on ice and the resistance to irregular wear can all be improved.

In the present embodiment, four of the sipes 20 are formed in each of the block-shaped land portions 18. Alternatively, six of the sipes 20 may be formed in each of the block-shaped land portions 18 as shown in FIG. 4, as a modification. The number of the sipes 20 in each of the block-shaped land portions 18 is not limited to the numbers shown above as examples.

Figure 5:
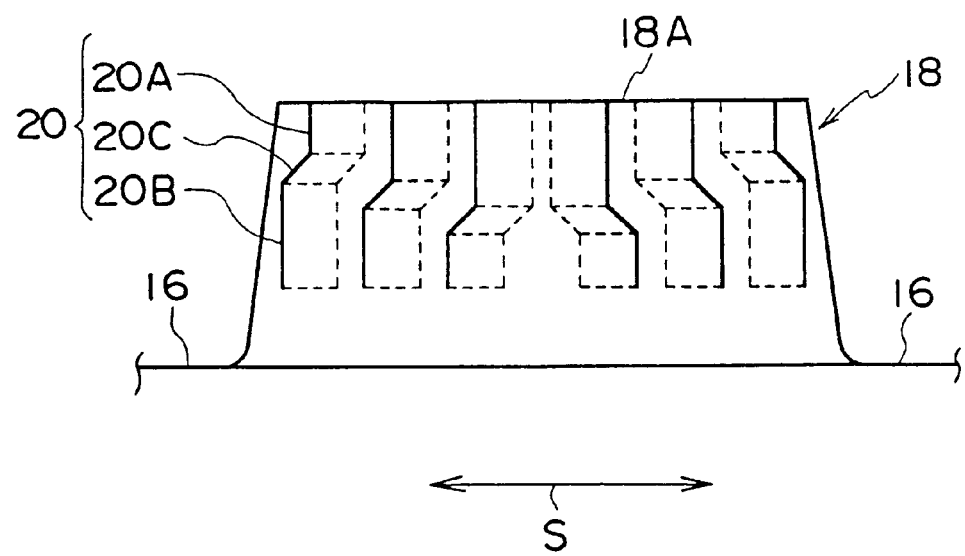
FIG. 5 shows a side view exhibiting still another modified example of a block-shaped land portion of a pneumatic tire in accordance with the first embodiment of the present invention.

In the present embodiment, the sipes 20 may be formed in a manner such that an inclined portion 20C placed closer to the central portion is placed at a deeper position in one of the block-shaped land portions 18 as shown in FIG. 5, as another modification. In this structure, bending down of the block-shaped land portion 18 can be suppressed more effectively than a structure having the inclined portion 20C at the same depth, when the structures having the same number of the sipe are compared. Therefore, a sufficient road holding area can be surely kept and the grip performance of the tire on wet surfaces, the acceleration and braking performance on ice and the resistance to irregular wear can be kept at a high level.

The operation of the tire with the modification shown in FIG. 5 will be described in the following.

In the pneumatic tire of the present modification, the inclined portions in the plurality of sipes formed in each of the block-shaped land portions are placed in a manner such that an inclined portion placed closer to the central line of each block-shaped land portion in the circumferential direction of the tire is placed at a deeper position. Therefore, rigidity of bending of the block-shaped land portion gradually increases from the central line in the circumferential direction of the block toward the side face of the block-shaped land portion exposed to a lug groove. Thus, the block-shaped land portion has an improved effect of suppressing bending down in comparison with a block-shaped land portion having the inclined portion at the same depth.

In the present embodiment, it is also possible that the sipe is not the crosscut sipe 20 which is formed from one end to the other end of the block-shaped land portion 18 as shown in FIG. 3 but is formed in another manner. For example, incomplete sipes may be formed in the following manner: a sipe similar to the sipe shown in FIG. 3 but reaching one main groove on one side and having one end portion in a longitudinal direction of the sipes stopping at a position inside the block-shaped land portion is disposed; another sipe similar to this sipe but reaching another main groove on the other side and having an end portion in another longitudinal direction of the sipes stopping inside the block-shaped land portion is disposed next to the above sipe in the circumferential direction of the tire; and these sipes formed alternatingly. A so-called crosscut sipe, such as the sipe 20, and the incomplete sipe described above may be suitably used in combination.

Second Embodiment

A second embodiment of a pneumatic tire of the present invention will be described with reference to FIG. 6A. In portions having the same construction as that in the first embodiment, the same reference numbers are used and descriptions thereof are omitted.

Figure 6A:
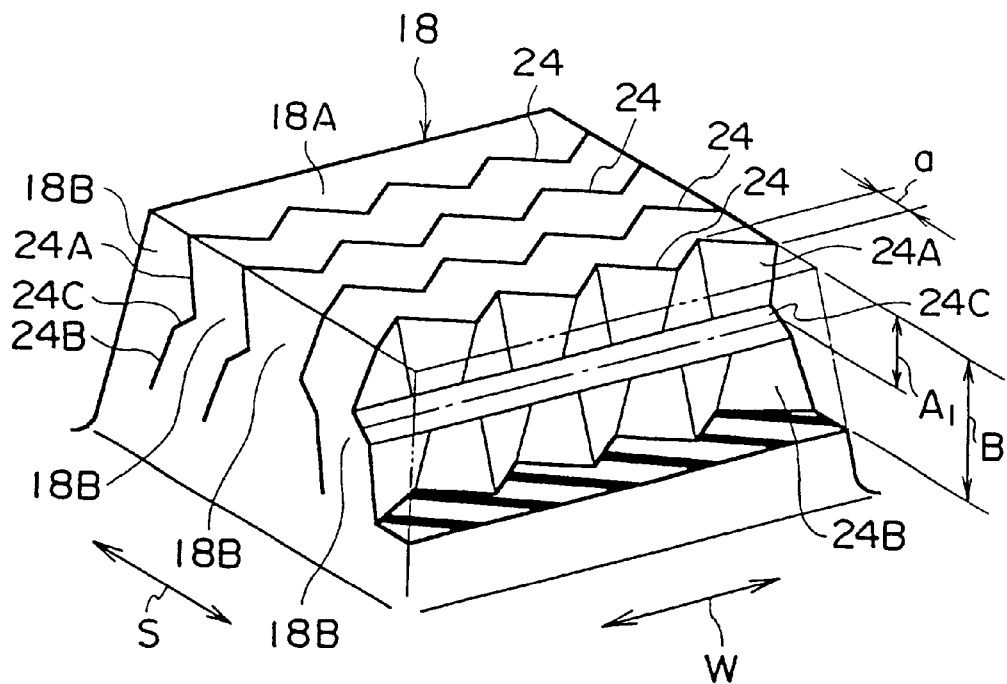
FIG. 6A shows a perspective view of a block-shaped land portion of a pneumatic tire in accordance with the second embodiment of the present invention.

As shown in FIG. 6A, a plurality of transverse sipes 24 are formed in a transverse direction of the tire (a direction shown by an arrow W) in each of the block-shaped land portions 18.

In FIG. 6A, the sipe 24 in the second embodiment is a so-called zigzag sipe (a sipe having a triangular wave shape) having the amplitude of a. This sipe essentially has the same construction as the sipe 20 described in the first embodiment. However, in the pneumatic tire of the present embodiment, the amplitude of the sipe 24 in the direction of the width of the sipe changes in the direction of the depth of the sipe and the change in the amplitude alternates from an increase to a decrease or from a decrease to an increase at one or a plurality of node positions disposed in the sipe in the direction of the depth of the sipe.

Figure 6B:
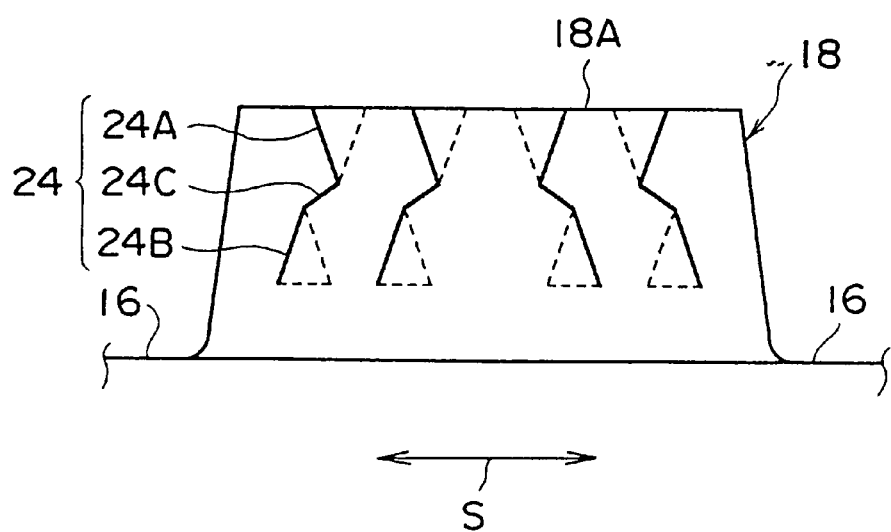
FIG. 6B shows a side view of the block-shaped land portion shown in FIG. 6A.

As shown in FIGS. 6A and 6B, the sipe 24 formed in the block-shaped land portion 18 is composed of a first portion 24A, a second portion 24B and an inclined portion 24C. The first portion 24A extends in a direction substantially perpendicular to a surface 18A that contacts the road and reaches the surface 18A that contacts the road. The second portion 24B extends in the direction substantially perpendicular to the surface 18A that contacts the road, is more distant from the surface 18A that contacts the road than the first portion 24A and is disposed at an offset position relative to the first portion 24A towards a side more distant from the center of the block-shaped land portion 18 in the circumferential direction of the tire. The inclined portion 24C is connected to the adjacent end portion of the first portion 24A and to the adjacent end portion of the second portion 24B and extends obliquely downward from the first portion 24A to the second portion 24B.

In the first portion 24A, the amplitude gradually decreases from the surface 18A that contacts the road toward a bottom portion of the sipe and the amplitude a becomes zero at a position connected to the inclined portion 24C.

In short, in the second embodiment, the sipe 24 has a shape bent in the direction of the depth which is formed by changing the amplitude of the sipe and also by disposing the first portion 24A and the second portion 24B at offset positions with respect to each other.

It is preferable in view of draining performance that the amplitude a of the entire inclined portion 24C is zero. Therefore, the amplitude of the entire inclined portion 24 is set at zero in the present embodiment. Alternatively the amplitude of the entire inclined portion 24C can naturally be set at zero in the unique arrangement of the present embodiment.

In the second portion 24B, the amplitude a is zero at the position connected to the inclined portion 24C and increases toward the bottom portion of the sipe.

In other words, in the second embodiment, the amplitude of the sipe 24 in each portion changes as follows: in the first portion: a→0, in the inclined portion: 0; and in the second portion: 0→a.

In the second embodiment, the depth B of each sipe 24 is set at the same value and the dimension $A_1$ from the surface that contacts the road to the central position (the position shown by the single-dashed chain line) of the inclined portion 20C is set at the same value for all the sipes 24.

In the second embodiment, the depth B of the sipe and the dimension $A_1$ are set to satisfy the relation: $1/10 < A_1/B < 1/2$.

An operation of the pneumatic tire 10 of the present embodiment will be described in the following.

The sipe 24 of the pneumatic tire 10 of the present embodiment has the inclined portion 24C in an intermediate position in the direction of the depth. Therefore, in comparison with a sipe extending straightly in the direction of the depth, the area of contact between the side faces of the sipe increases and the effect of suppressing bending down of the block-shaped land portion 18 when acceleration or braking is applied increases.

At the inclined portion 24C, the side faces of the sipe contact each other easily when the block-shaped land portion 18 is deformed by compression force because the inclined portion 24C is disposed in a direction intersecting the direction of the compression, and the force of contact between the side faces of the sipe caused by deformation of the block further increases. Therefore, the block-shaped land portion 18 of the present embodiment shows less bending down than conventional blocks in which sipes without the inclined portions 24C are formed.

Thus, the pneumatic tire 10 of the second embodiment can more effectively suppress bending down of the block-shaped land portion 18 under application of acceleration or braking even when the number of the sipes increases because the contact area between the side faces of the sipe increases and the force of contact between the side faces of the sipe at the inclined portion 24C increases under deformation by compression force, due to the presence of the inclined portion 24C.

As described above, in the pneumatic tire 10 of the second embodiment, deterioration in the road holding property caused by an increase in the number of the sipe can be suppressed by suppressing the increase in deformation of the block-shaped land portion 18. As a result, the grip performance of the tire on wet surfaces, the acceleration and braking performance on ice and the resistance to irregular wear can all be improved.

In the pneumatic tire 10 of the second embodiment, the amplitude a of the sipe 24 becomes zero at the inclined portion 24C. Therefore, water supplied by breaking the water layer between the tire and a road surface by edges of the sipe 24 exposed at the surface 18A that contacts the road and sucked into the inside of the sipe 24 can be removed smoothly from the side faces of the block-shaped land portion 18 (end portions of the sipe 24 in the longitudinal direction) to the main grooves 14 via the inclined portion 24C, which has an amplitude of zero and extends straightly in the transverse direction of the tire. Thus, the draining performance is improved.

In general, a sipe extending straightly in the transverse direction of the tire cannot break the water layer between the tire and the road surface because the length of the sipe exposed at the surface that contacts the road is insufficient. On the other hand, a sipe in which an amplitude is present at the surface of the block and remains unchanged in the direction of the depth (for example, conventional zigzag type sipes) can somehow break the water layer by the amplitude-having structure formed on the block surface and can suck water between the tire and the road surface into the inside of the sipe. However, water sucked in the middle portion of the block cannot be removed smoothly to the outside of the block.

Thus, the above drawbacks of conventional tires can all be overcome by the pneumatic tire of the present invention.

When a relation between $A_1$ and B is in a range of $A_1/B<1/10$, the inclined portion 24C disappears in an early stage of wear and the effect of the present invention may be lost. Moreover, heel-and-toe wear takes place in a middle stage of wear due to the decrease in rigidity of the block.

When the relation between $A_1$ and B is in a range of $1/2<A_1/B$, the distance between the inclined portion 24C and the surface 18A that contacts the road increases and the draining performance deteriorates. Therefore, the sipe 24 cannot sufficiently suck up water between the tire and the road surface and the effect of the present invention may not be fully exhibited.

Figure 7:
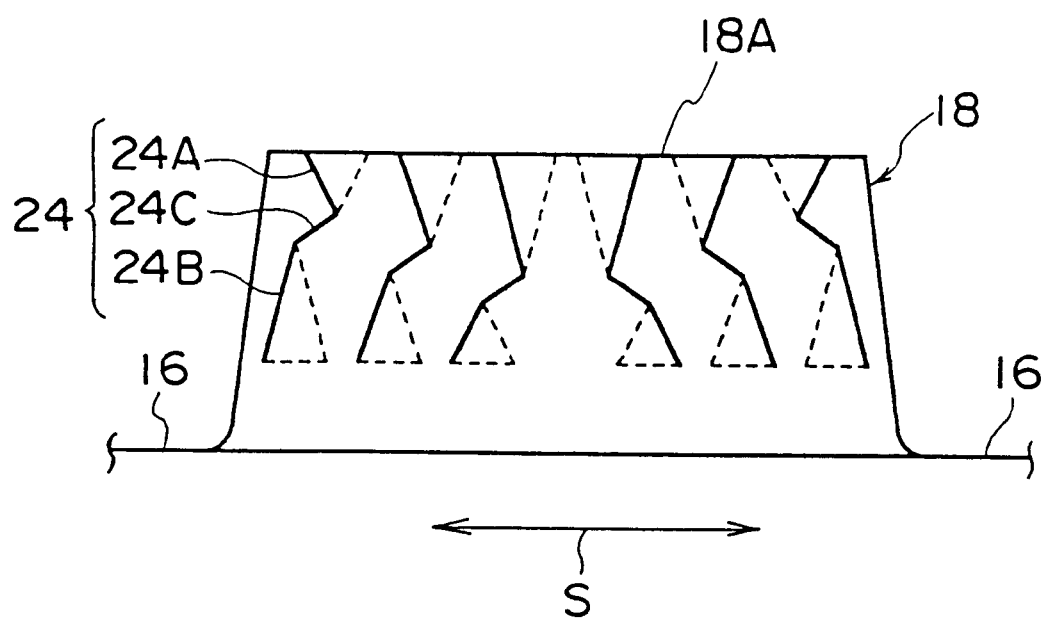
FIG. 7 shows a side view exhibiting a modified example of a block-shaped land portion of a pneumatic tire in accordance with the second embodiment of the present invention.

Similarly to the first embodiment, the sipes 24 in the second embodiment may be formed in a manner such that an inclined portion 24C placed closer to the central portion is placed at a deeper position in one of the block-shaped land portions 18 as shown in FIG. 7, as another modification. In this structure, bending down of the block-shaped land portion 18 can be suppressed more effectively than a structure having the inclined portion 24C at the same depth, when the structures having the same number of the sipe are compared. Therefore, a sufficient road holding area can be surely kept and the grip performance of the tire on wet surfaces, the acceleration and braking performance on ice and the resistance to irregular wear can be kept at a high level.

The sipe 24 may also be disposed in a manner such that the second portions 24B adjacent to each other have shapes which are substantially symmetrical with respect to the central line between these second portions 24B in the direction of the depth of the sipes, although this arrangement is not shown in figures.

It is preferable that the amplitude a in the present embodiment is in a range of from 1 to 3 mm. When the amplitude a is less than 1 mm, the area of contact between the side faces of the sipe decreases and the effect of the sipe decreases. When the amplitude a exceeds 3 mm, the distance between the sipes increases and the number of the sipes formed in one block-shaped land portion decreases.

EXAMPLES

To confirm the advantages of the pneumatic tires specifically shown in the first and second embodiments of the present invention, conventional tires and tires in accordance with the first and second embodiments were prepared and the braking performance on ice and the resistance to heel-and-toe wear of the prepared tires were evaluated. All tires had a size 185/70R14.

The braking performance on ice was evaluated as follows: Tires were fixed to an automobile. The automobile was braked strongly while being driven on ice at a speed of 20 km/h. The distance between the position of braking and the position of stopping was measured and the inverse of the obtained value was used as the braking performance on ice. The result obtained with the conventional tire was set at 100 and the results obtained with the test tires of the present invention were expressed as indices relative to this value. The results are shown in Table 1. The greater the value, the more excellent the performance. The above measurement was conducted by using new tires and tires with 50% wear(abrasion), each in two repeated runs.

The resistance to heel-and-toe wear was evaluated as follows: Difference in the height of steps formed by the heel-and-toe wear was measured after the automobile had been driven for 20,000 km. The inverse of the obtained value was used as the resistance to heel-and-toe wear(abrasion). The result obtained with the conventional tire was set at 100 and the results obtained with the test tires of the present invention were expressed as indices relative to this value. The results are shown in Table 1. The greater the value, the more improved the resistance.

Example 1

Pneumatic tires having a tread having block-shaped land portions shown in FIG. 1A in accordance with the first embodiment were prepared. The construction was as follows: the block-shaped land portion had a length L1 in the circumferential direction of the tire of 20 mm, a length L2 in the transverse direction of the tire of 20 mm and a height H of 10 mm; and the sipe had a depth B of 7 mm, a dimension $A_1$ from the surface that contacts the road to the central position of the inclined portion of 3.5 mm and an amplitude a of 1.5 mm.

Example 2

Pneumatic tires having a tread having block-shaped land portions shown in FIG. 6A in accordance with the second embodiment were prepared. The construction was as follows: the block-shaped land portion had the same dimensions as those of the tires in the first embodiment; and the sipe had a depth B of 7 mm, a dimension $A_1$ from the surface that contacts the road to the central position of the inclined portion of 3.5 mm and the maximum value of the amplitude a of 1.5 mm.

Example of Conventional Tire

Figure 12:
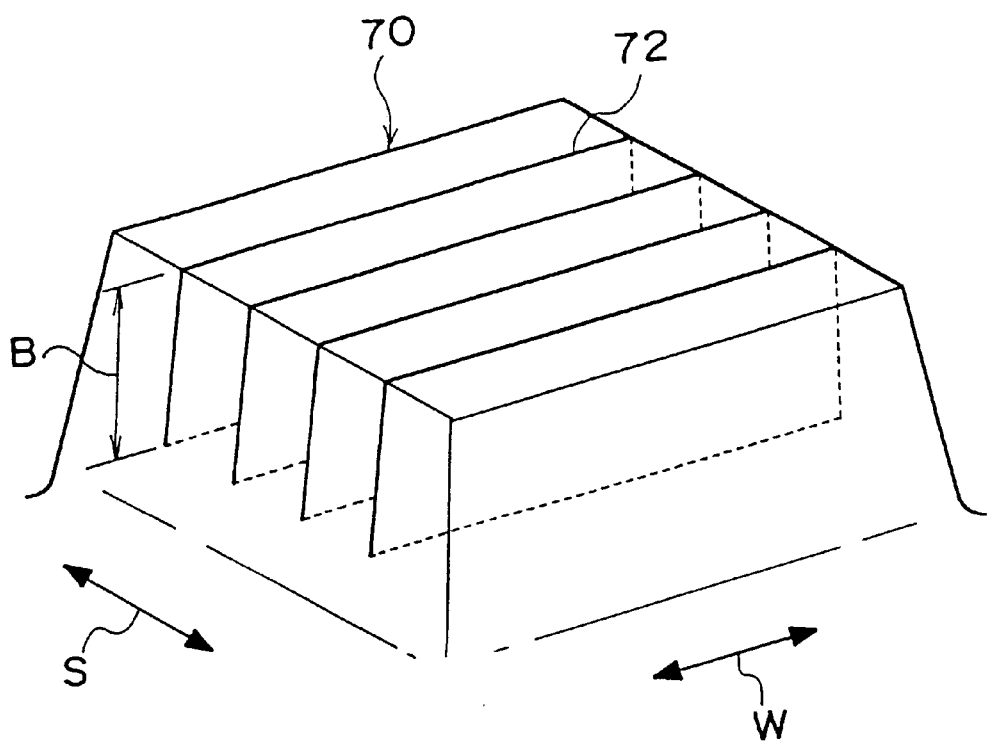
FIG. 12 shows a perspective view exhibiting a block-shaped land portion of a conventional pneumatic tire.

Pneumatic tires having straight sipes 72 were prepared. The block-shaped land portions 70 had the same dimensions as those of the tires in the first and second embodiments as shown in FIG. 12. The depth B of the straight sipe 72 was the same as that of tires of Example 1 and 2, i.e., 7 mm.

TABLE 1

|  | Example 1 | Example 2 | Conventional |
|---|---|---|---|
| Braking performance on ice new tire | 105 | 106 | 100 |
| Braking performance on ice 50% wear (abrasion) | 104 | 102 | 100 |
| Resistance to heel-and-toe wear after driving for 20,000 km | 104 | 104 | 100 |

The results in Table 1 clearly show that the tires of Examples 1 and 2 in accordance with the present invention exhibited better braking performance on ice than that of the conventional tire.

The tire of Example 2 exhibited excellent braking performance on ice compared to that of the tire of Example 1 because the draining performance at the inclined portion of the sipe was more excellent in the tire of Example 2.

The tire of Example 1 had better braking performance on ice than that of other tires in the 50% wear(abrasion) state because the tire of Example 1 had a larger length of edges on the surface of the block.

As described above, the pneumatic tire of the present invention exhibits the excellent effect in that the grip performance of the tire on wet surfaces, the acceleration and braking performance on ice and the resistance to irregular wear are improved due to the constructions of the above embodiments.

By using the construction shown in the second embodiment, water sucked into the inside of the sipes can be removed smoothly to the main grooves from the side faces of the blocks via routes around the portions of the sipes where the amplitude of the sipe becomes zero. Thus, another excellent effect is exhibited in that the grip performance of the tire on wet surfaces and the acceleration and braking performance on ice can be further improved.

By using the construction shown in the modifications in the first embodiment, the effect to suppress deformation is enhanced and the performances on ice and the performances on wet roads are improved; and the heel-and-toe wear is suppressed due to the improved balance in suppressing deformation and to the improved uniformity of pressure on the surface of the road, thus maintaining the resistance to irregular wear at a high level.

Third Embodiment

The third embodiment of the pneumatic tire of the present invention will be described with reference to FIG. 8. In portions having the same construction as that in the above embodiments, the same marks are used and descriptions on these marks are omitted.

Figure 8:
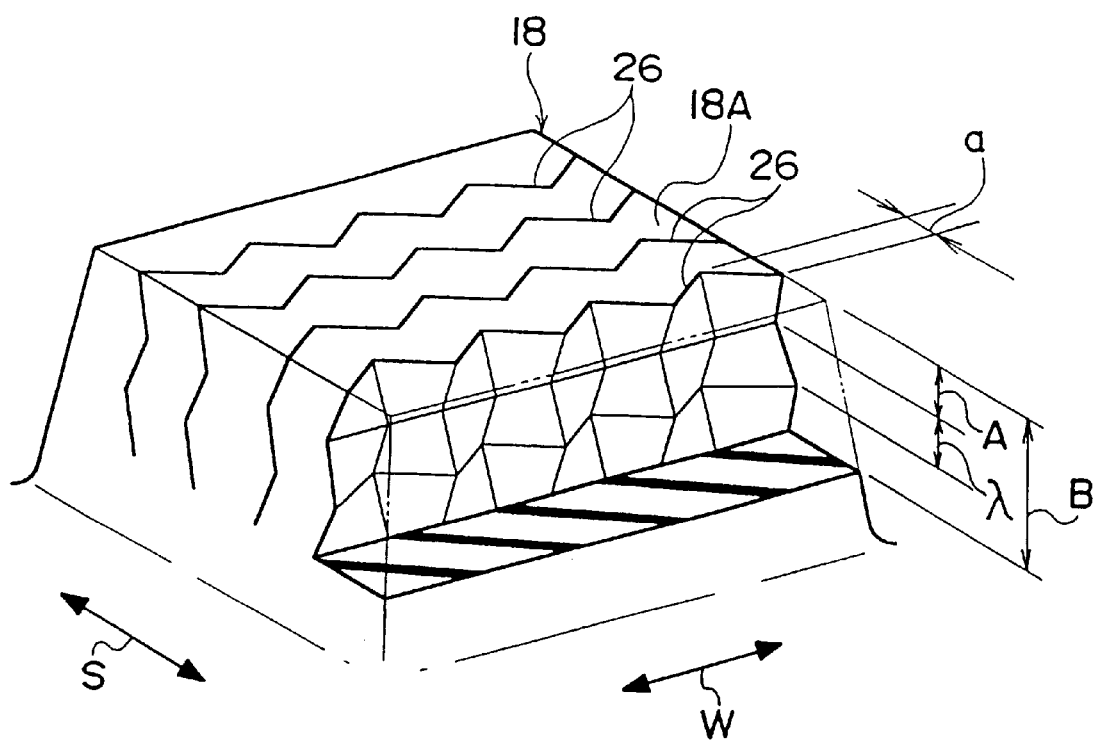
FIG. 8 shows a perspective view of a block-shaped land portion of a pneumatic tire in accordance with the third embodiment of the present invention.

As shown in FIG. 8, similar to the above embodiments, the sipe of the present embodiment has an amplitude in the direction of the width of the sipe and extends in the transverse direction of the tire. The amplitude changes in the direction of the depth of the sipe and the change in the amplitude alternates from an increase to a decrease or a decrease to an increase at one or a plurality of node portions disposed in the sipe in the direction of the depth of the sipe.

In other words, in the third embodiment, the sipe has a shape bent in the direction of the depth which is formed by the change in the amplitude of the sipe.

As shown in FIG. 8, the sipe 26 of the third embodiment has a zigzag shape at the surface that contacts the road 18. The amplitude a of the zigzag shape gradually decreases toward the bottom portion and becomes zero at a specific depth A. The amplitude then gradually increases toward the bottom portion and, at a specific depth $A+\lambda$, becomes the same value (=a) as that at the surface 18A that contacts the road. Subsequently, the amplitude gradually decreases toward the bottom portion and becomes zero at the bottom portion.

In other words, in the third embodiment, the amplitude of the sipe 26 changes from the surface that contacts the road to the bottom portion successively in the above portions as follows: $(a \rightarrow 0)$, $(0 \rightarrow a)$ and $(a \rightarrow 0)$.

The shape of the sipe 26 exposed at the surface 18A that contacts the road is not limited to the zigzag shape but may be other shapes such as a sine curve.

In the sipe 26 of the third embodiment, the area of contact between the side faces of the sipe is larger than that of a conventional sipe which has the same depth as the sipe 26 and extends straightly in the direction of the depth, and thus the effect of suppressing bending down of the block-shaped land portion 18 increases when acceleration or braking is applied.

The amplitude a of this sipe 26 changes in the direction of the depth and the shape of the cross-section of the sipe in the direction perpendicular to the longitudinal direction of the sipe substantially has a shape bent in the direction of the depth. Similar to the above embodiments, sides of the adjacent sipes are easily brought into contact each other when the block-shaped land portion 18 is deformed by compression force. Therefore, the force of contact between the side faces of the sipe increases when the block is deformed and the block-shaped land portion 18 of the present embodiment shows less bending down in comparison with a conventional block-shaped land portion having sipes which extend straightly in the direction of the depth.

In the third embodiment, the sipe having an amplitude a has an increased area of contact between the side faces of the sipe and an increased force of contact between the side faces of the sipe when the block is deformed by compression force and the bending down of the block-shaped land portion 18 under application of acceleration or braking can be suppressed more effectively even when the number of the sipe is increased. Thus, the grip performance of the tire on wet surfaces, the acceleration and braking performance on ice and the resistance to irregular wear can be improved similarly to the above embodiments.

When a plurality of node positions where the change in the amplitude occurs are disposed in place of a single node position in a manner shown in the sipe 26 of the present embodiment, and for example, when the node position of the amplitude change closest to the surface 18A that contacts the road disappears by wear, another node position of the amplitude change is existing in the direction of the depth. Therefore, deterioration in the various performances by wear can be prevented.

When a plurality of the node positions of the amplitude are disposed in a manner shown in the sipe 26 of the present embodiment, node positions of the amplitude change other than the node position closest to the surface 18A that contacts the road are not required to satisfy the condition for smoothly removing water sucked into the inside of the sipe, i.e., 1/10<A/B<1/2, described in the first embodiment. It is preferable that the distance A between adjacent node positions of the amplitude change is at least 0.125B.

Fourth Embodiment

The pneumatic tire of the present embodiment has block-shaped land portions shown in FIG. 9 in the tread. The dimensions of the block-shaped land portions are the same as those of the first embodiment. The pneumatic tire of the fourth embodiment is characterized in that the sipes have three node positions of the amplitude change between the surface that contacts the road and the bottom portion of the block.

The sipe 28 in the present embodiment may have, for example, the following construction: the depth: 7 mm; the number of the node position of the amplitude change between the surface that contacts the road and the bottom portion: 3; the distance λ between adjacent node positions of the amplitude change: 0.25B (=1.75 mm); and the maximum value of the amplitude a: 1.5 mm.

The amplitude of the sipe 28 changes from the surface that contacts the road to the bottom portion successively in the portions as follows: (a→0), (0→a), (a→0) and (0→a).

Fifth Embodiment

The fifth embodiment of the pneumatic tire of the present invention is described with reference to FIG. 10 in the following.

The internal structure of the pneumatic tire 10 of the present embodiment is essentially the same as that of the third embodiment. The sipe 30 in the present embodiment has a zigzag shape (a shape of a triangular wave) at the surface that contacts the road 18. As shown in FIG. 10, the amplitude a gradually decreases toward the bottom portion and becomes zero at the central position in the direction of the depth (A=0.5B). Then, the amplitude gradually increases from the central position in the direction of the depth toward the bottom portion.

In other words, in the fifth embodiment, the sipe 30 is composed of two portions in the direction of the depth and the amplitude of the sipe changes from the surface that contacts the road to the bottom portion successively in the above portions as follows: (a→0) and (0→a).

In the present embodiment, the depth B is the same in all sipes 30. The dimension A from the surface 18A that contacts the road to the closest position where the amplitude is zero is also the same in all sipes 30.

The shape of the sipe 30 exposed at the surface 18A that contacts the road is not limited to the zigzag shape but may be other shapes such as a sine curve.

By the same reason as that described for the above embodiments, the depth B and the dimension A of the sipe may be decided so as to satisfy the relation: 1/10<A/B<2/3.

In the present embodiment, the sipe 30 substantially has a shape in which the cross-section of the sipe in the circumferential direction of the tire is bent in the direction of the depth and the bending down of the block-shaped land portion 18 is suppressed in comparison with that of a conventional block-shaped land portion having sipes which extend straightly in the direction of the depth.

The sipe having an amplitude a has an increased area of contact between the side faces of the sipe and an increased force of contact between the side faces of the sipe when the block is deformed by compression force and the bending down of the block-shaped land portion 18 under application of acceleration or braking can be suppressed more effectively even when the number of the sipe is increased.

Similar to the above embodiments, the grip performance of the tire on wet surfaces, the acceleration and braking performance on ice and the resistance to irregular wear can all be improved in the pneumatic tire 10 of the present embodiment because the increase in the deformation of the block-shaped land portion 18 caused by an increase in the number of the sipe can be suppressed and deterioration in the road holding properties can be prevented.

When the relation of A and B is in the range of A/B<1/10, the portion where the amplitude becomes zero, i.e., the node position of the amplitude change, disappears in an early stage of wear and the effect of the present invention may be lost. Moreover heel-and-toe wear takes place in a middle stage of wear due to the decrease in rigidity of the block.

When the relation of A and B is in the range of 2/3<A/B, rigidity decreases only at a bottom portion (a base portion) of the small blocks divided by the sipes 20. Deformation is concentrated to an area around the bottom portion of the small blocks and bending down of the block-shaped land portion 18 cannot be suppressed. Therefore, heel-and-toe wear may take place in an early stage of wear.

In the pneumatic tire of the present embodiment, due to the change in the amplitude a in the direction of the depth, water supplied by breaking the water layer by the surface 18A that contacts the road and sucked up into the inside of the sipe can be smoothly removed from the side faces of the block-shaped land portion 18 (at end portions of the sipe 30 in the longitudinal direction) to the main grooves 14 via the portion having an amplitude a of zero or a small value. Thus, the draining performance is improved.

To smoothly remove water sucked up into the inside of the sipe via the portion of the sipe 30 having an amplitude a of zero or a small value, it is preferable that the relation between the depth B and the dimension A of the sipe is decided to satisfy the relation: 1/10<A/B<1/2.

When the relation of A and B is in the range of A/B<1/10, the effect of the present invention may be lost in an early stage of wear. When the relation of A and B is in the range of 1/2<A/B, the sipe 30 cannot suck up water sufficiently and a sufficient effect cannot be obtained.

In the present embodiment, four sipes 30 are formed in the block-shaped land portion 18. However, more than four sipes 30 may be formed in one block-shaped land portion 18. The number of the sipe 30 in one land-shaped land portion is not limited to the numbers shown as the examples in the present embodiment.

Figure 10:
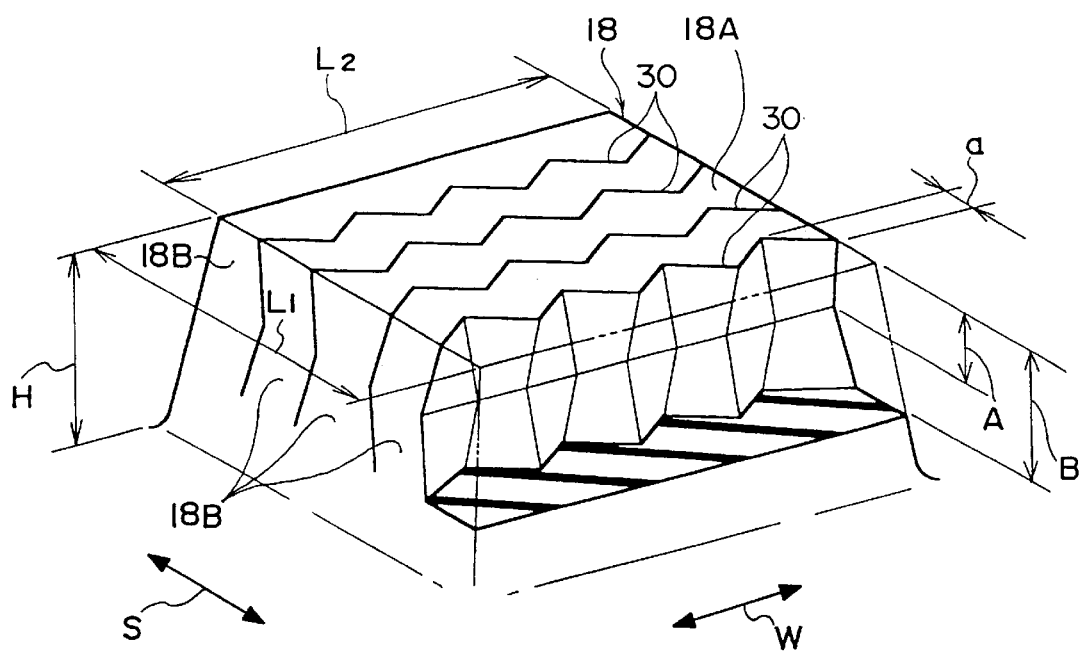
FIG. 10 shows a perspective view of a block-shaped land portion of a pneumatic tire in accordance with the fifth embodiment of the present invention.

It is also possible that the sipe is not the crosscut sipe 30 which is formed from one end to the other end of the block-shaped land portion 18 as shown in FIG. 10 but is formed in another manner. For example, incomplete sipes may be formed in the following manner: a sipe similar to the sipe shown in FIG. 10 but reaching one main groove on one side and having one end portion in a longitudinal direction of the sipes stopping at a position inside the block-shaped land portion is disposed; another sipe similar to this sipe but reaching another main groove on the other side and having an end portion in another longitudinal direction of the sipes stopping inside the block-shaped land portion is disposed next to the above sipe in the circumferential direction of the tire; and these sipes are formed alternatingly.

The crosscut sipes such as the sipe 30 and the incomplete sipe described above may be suitably used in combination.

Sixth Embodiment

The sixth embodiment of the pneumatic tire of the present invention will be described with reference to FIG. 11. In portions having the same construction as that in the above embodiments, the same marks are used and descriptions on these marks are omitted.

The sipe 32 in the present embodiment has a shape of a straight line at the surface that contacts the road 18 and a zigzag shape (a shape of a triangular wave) in portions toward the bottom portion. The amplitude a gradually increases toward the bottom portion, has a maximum value at the middle position in the direction of the depth, then gradually decreases toward the bottom portion in the direction of the depth and becomes zero at the bottom portion.

In other words, in the sixth embodiment, the sipe 30 is composed of two portions. The amplitude changes from the surface that contacts the road to the bottom portion successively in the above two portions as follows: (a→0) and (0→a).

In the present embodiment, the depth B of the sipe and the dimension A of the sipe can be decided so as to satisfy the relation: $1/10 < A/B < 2/3$.

Similar to the fifth embodiment, the sipe 32 in the present embodiment substantially has an increased area of contact between the side faces of the sipe in comparison with that of sipes which has the same depth and extend straightly in the direction of the depth, and the bending down of the block-shaped land portion 18 is suppressed when acceleration or braking is applied.

The cross-section of the sipe 32 in the circumferential direction of the tire substantially has a shape bent in the direction of the depth due to the change in the amplitude a in the direction of the depth. When the block 18 is deformed by compression force, faces of the sipe are easily brought into contact each other and force of contact between faces of the sipe is further enhanced. Thus, the bending down of the block-shaped land portion 18 is suppressed in comparison with that of a conventional block-shaped land portion having sipes which extend straightly in the direction of the depth.

In the sixth embodiment, the sipe having an amplitude a has the increased area of contact between the side faces of the sipe and the increased force of contact between the side faces of the sipe when the block is deformed by compression force, and the bending down of the block-shaped land portion 18 under application of acceleration or braking can be suppressed more effectively even when the number of the sipe is increased. Thus, similar to the fifth embodiment, the grip performance of the tire on wet surfaces, the acceleration and braking performance on ice and the resistance to irregular wear can all be improved.

The force of contact between the side faces of the sipe is further enhanced due to the large area of contact between the side faces of the sipe 32 and deformation of the block-shaped land portion 18 is suppressed. Thus, the road holding property is improved. In particular, the resistance to irregular wear is improved.

It is preferable that the amplitude a of the sipe in the present embodiment is set in the range of 1 to 3 mm. When the amplitude is less than 1 mm, the area of contact between the side faces of the sipe decreases and the effect of the sipe decreases. When the amplitude exceeds 3 mm, the distance between the sipes increases and the number of the sipe which can be formed in one block-shaped land portion decreases.

EXAMPLE

To confirm the advantages of the present invention, conventional tires and tires in accordance with the fourth and fifth embodiments were prepared and the braking performance on ice was evaluated. All tires had a size 185/70R14.

The braking performance on ice was evaluated as follows: Tires were fixed to an automobile. The automobile was braked strongly while being driven on ice at a speed of 20 km/h. The distance between the position of braking and the position of stopping was measured and the inverse of the obtained value was used as the braking performance on ice. The result obtained with the conventional tire was set at 100 and the results obtained with the test tires of the present invention were expressed as indices relative to this value. The results are shown in Table 2. The greater the value, the more excellent the performance. The above measurement was conducted by using new tires and tires with 50% wear, each in two repeated runs.

Example 3

Pneumatic tires having a tread having block-shaped land portions shown in FIG. 10 in accordance with the fifth embodiment were prepared. The construction was as follows: the block-shaped land portion had a length L1 in the circumferential direction of the tire of 20 mm, a length L2 in the transverse direction of the tire of 20 mm and a height H of 10 mm; and the sipe had a depth B of 7 mm, a dimension A from the surface that contacts the road to the node position of the amplitude change of 3.5 mm and an amplitude a of 1.5 mm.

Example 4

Pneumatic tires having a tread having block-shaped land portions shown in FIG. 9 in accordance with the fourth embodiment were prepared. The construction was as follows: the block-shaped land portion had the same dimensions as those of the tires in the fifth embodiment; and the sipe had a depth B of 7 mm, three node positions of the amplitude change between the surface that contacts the road and the bottom portion, the distance between the adjacent node positions of the amplitude change λ of 0.25B (=1.75 mm), and the maximum value of the amplitude a of 1.5 mm.

Example of Conventional Tire

Pneumatic tires having straight sipes were prepared. The block-shaped land portions had the same dimensions as those of the tires in the first and second embodiments as shown in FIG. 12. The depth B of the straight sipe was the same as that of tires of Examples described above, i.e., 7 mm.

TABLE 2

|  | Example 3 | Example 4 | Conventional |
|---|---|---|---|
| Braking performance on ice new tire | 105 | 106 | 100 |
| Braking performance on ice 50% wear | 101 | 105 | 100 |

The results in Table 2 clearly show that the tires in accordance with the fourth and fifth embodiments of the present invention exhibited better braking performance on ice than that of the conventional tire.

The tire of Example 4 in accordance with the fourth embodiment showed more excellent braking performance on ice at 50% wear than that of the tire of Example 3 in accordance with the fifth embodiment because a plurality of the node positions of the amplitude change were formed.

As described above, the pneumatic tires in accordance with the fourth and fifth embodiments of the present invention exhibit the excellent effect in that the grip performance of the tire on wet surfaces, the acceleration and braking performance on ice and the resistance to irregular wear are all improved due to the constructions of the above embodiments.

Similar to the tires in accordance with the first and second embodiments, water sucked into the inside of the sipes can be removed smoothly to the main grooves from the side faces of the blocks via routes around the portions of the sipes where the amplitude of the sipe becomes zero. Thus, the grip performance of the tire on wet surfaces and the acceleration and braking performance on ice of these tires can be further improved.

In particular, the tire in accordance with the sixth embodiment exhibits improved resistance to irregular wear due to the great effect of suppressing deformation, as well as remarkably improved performance on ice in the abraded condition due to the increased amplitude of the sipe.

It should be noted that excellent effects as observed in Examples 4 and 5 will also to be obtained for the structures according to the third and sixth embodiments, although such Examples are not included here, because these four(third-sixth) embodiments are designed based on the same principal of the invention.

What is claimed is:

1. A pneumatic tire having a tread pattern, said tread pattern comprising:

block-shaped land portions demarcated by a plurality of main grooves extending in a circumferential direction of the tire and by a plurality of lug grooves intersecting the main grooves; and at least four sipes provided in each block-shaped land portion, wherein each of the sipes has, at least on a tread surface, an amplitude in a direction orthogonal to a longitudinal direction of the sipe, each of the sipes including a first portion, a second portion and a third portion, the first portion being a portion of the sipe located on the tread surface side in a depthwise direction, the first portion extending straight in a direction orthogonal to the tread surface, the second portion being a portion of the sipe located on the sipe bottom side of the depthwise direction, the first portion and the second portion being disposed so as to be offset and separated from each other by a predetermined distance therebetween in a direction of sipe width, the first portion and the second portion being connected to each other by the third portion, the third portion extending in a direction which intersects a radial direction of the tire wherein two of said at least four sipes define a small block having a tread surface portion and a bottom portion, the width of the bottom portion being greater than the width of the tread surface portion.

2. A pneumatic tire according to claim 1, wherein the second portion extends straight in a direction orthogonal to the tread surface.

3. A pneumatic tire according to claim 1, wherein said at least four sipes all extend in a transverse direction of said tire at the amplitude.

4. A pneumatic tire according to claim 1, wherein said at least four sipes are arranged in each block portion with a first group of sipes oriented transversely in a first orientation and a second group of sipes oriented transversely in a second orientation.

5. A pneumatic tire according to claim 4, wherein said at least four sipes are zig zag, and said first orientation is a transverse shift of said zig zag relative to said second orientation.

6. A pneumatic tire according to claim 1, wherein said second portion is offset from said first portion in the circumferential direction of the tire.

7. A pneumatic tire according to claim 1, wherein said sipes have a total depth B and a depth A extending from said tread surface to a central position of said third portion and $1/10 < A/B < 2/3$.

8. A pneumatic tire having a tread pattern, said tread pattern comprising:

block-shaped land portions demarcated by a plurality of main grooves extending in a circumferential direction of the tire and by a plurality of lug grooves intersecting the main grooves; and at least four sipes provided in each block-shaped land portion, wherein each of the sipes has, at least on a tread surface, an amplitude in a direction orthogonal to a longitudinal direction of the sipe, each of the sipes including a first portion, a second portion and a third portion, the first portion being a portion of the sipe located on the tread surface side and extending in a depthwise direction, the second portion being a portion of the sipe located on the sipe bottom side in the depthwise direction, the first portion and the second portion being disposed so as to be offset and separated from each other with a predetermined distance therebetween in a direction of sipe width, the first portion and the second portion being connected to each other by the third portion, the third portion extending in a direction which intersects a radial direction of the tire, and the third portion having a flat surface in a transverse direction extending the length of the sipe.

9. A pneumatic tire according to claim 8, wherein said at least four sipes all extend in a transverse direction of said tire at the amplitude.

10. A pneumatic tire according to claim 8, wherein said at least four sipes are arranged in each block portion with a first group of sipes oriented transversely in a first orientation and a second group of sipes oriented transversely in a second orientation.

11. A pneumatic tire according to claim 10, wherein said at least four sipes are each zig zag, and said first orientation is a transverse shift of said zig zag relative to said second orientation.

12. A pneumatic tire according to claim 8, wherein said second portion is offset from said first portion in the circumferential direction of the tire.

13. A pneumatic tire according to claim 8, wherein said amplitude gradually decreases from said tread surface and is zero at a point where said first portion joins said third portion.

14. A pneumatic tire according to claim 8, wherein each of said sipes has a total depth B and an intermediate depth A from the tread surface to a central position of said third portion and said third portion is inclined in said circumferential direction of said tire by a constant angle.

15. A pneumatic tire according to claim 14, wherein the depth B and the depth A of the sipes satisfy a relation: $1/10 < A/B < 1/2$.

* * * * *